Patented Aug. 31, 1948

2,448,337

UNITED STATES PATENT OFFICE 2,448,337

ACTIVATED CARBON PRODUCTS

Leonard Wickenden, Manhasset, N. Y.

No Drawing. Application December 2, 1944,
Serial No. 566,389

4 Claims. (Cl. 252—262)

I have invented a new activated carbon product which has several important advantages. Embodiments of the product of my invention are described in my Patent 2,372,996.

My new activated carbon product consists essentially of granular petroleum coke coated with about 3%–6% by weight of an activated carbon black particularly an activated carbon black, having a mean particle size of less than about 100 millimicrons, or better 60 millimicrons. The activated carbon described in my application filed concurrently herewith Serial No. 566,388 (now abandoned) is particularly advantageous in my new product. Petroleum cokes having a volatile content of less than 8% are used with advantage.

My new activated carbon product is particularly useful in percolation-filtration operations, such as those described in my Patent No. 2,372,996. The combined product has the strength and structure required for simple handling and for maintaining good filter bodies and has unusual stability in the sense that the activated carbon is not easily carried off from the petroleum coke carrier during the operation. This combination of qualities has, for example, enabled me to increase the rate of filtration in such percolation-filtration operations applied to decolorization of sugar melts, as much as five fold by simply replacing the conventional material with my new product without impairing the decolorization effected. In general my new product permits unusually high rates of filtration.

My new product can be prepared in several ways. For example, and particularly when the new activated carbons described in my concurrently filed application Serial No. 566,388 are used, the petroleum coke can be ground and graded to separate a fraction passing a 10 mesh screen and retained on a 60 mesh screen or a fraction passing a 20 mesh screen and retained on a 100 mesh screen, this fraction can be saturated with water, or if the product is to be used in processing sugar with a sugar syrup, and then, after being drained, the wet fraction can be thoroughly stirred into the requisite amount of finely divided activated carbon, and the mixture can be dried to prepare my new product. Or for example, the similarly ground and graded fraction of petroleum coke can be thoroughly stirred into an excess of the finely divided activated carbon which has first been wet with water or, as above stated, with a sugar syrup, and this mixture can be dried and screened, to separate excess activated carbon, to prepare my new product.

The new activated carbon described in my concurrently filed application Serial No. 566,388 consists essentially of a partially oxidized channel carbon black having a mean particle size of less than about 100 millimicrons, or better 60 millimicrons, an ash content of less than 0.25% by weight, that is, substantially ash free, and a molasses value of at least 85, 85 to 90 or somewhat higher. This new activated carbon is characterized by its extremely small particle size. It also adheres with unusual tenacity to the petroleum coke carrier. And it wets readily and disperses well in water thus quickly forming a suspension which carries the activated carbon to all surfaces of the petroleum coke carrier when the two are mixed. These properties, combined with its efficacy, make it particularly advantageous as the activated carbon component of my new product. Other activated carbons, in powdered form and in general the finer the powder the better, can however, be used in my new product.

The new activated carbon to which I have just referred can be produced by exposing a charge of channel carbon black to air in an appropriate furnace for a period of about 20 to 40 minutes while maintaining a temperature of about 400°–550° C. for example. With the same air supply, a longer period is required at lower temperature for equivalent activation. The charge must either be exposed in thin layers, not over about ¼" in thickness for example, or it must be effectively agitated to expose all portions of the charge while at the reaction temperature.

The "molasses value" is a measure, quite generally used in connection with the decolorization of sugars, of the adsorptive value of a decolorizing medium. In making this test I proceed as follows: Dissolve 2 grams of blackstrap molasses in sufficient water to form 100 cubic centimeters of solution, and filter cold through kieselguhr on a Buchner funnel. Mix 0.5 gram of carbon to be tested with 50 cubic centimeters of this solution, heat to boiling on a hot plate, remove from hot plate, stir for 10 seconds and filter through fluted 15 centimeter No. 5 Whatman paper on a stemless funnel into a 150 cubic centimeter beaker. This filtrate is put into a square glass bottle. 5 cubic centimeters of the same 2% molasses solution, after filtration, is put into a duplicate square glass bottle and water is added to this second bottle, from a burette, until the colors match. The molasses value is then calculated as follows:

$$\frac{c.\ c.\ of\ water\ added}{c.c.\ of\ water\ added + 5\ c.c.\ (molasses\ solution)} \times 100 = molasses\ value$$

The same measure is sometimes determined by comprising the relative heights of columns of the two solutions required to match colors in a colorimeter.

My new activated carbon product, granular petroleum coke carrier coated with finely divided activated carbon black, forms an extremely stable filter body particularly when substantially dehydrated or thoroughly dried. The activated carbon is held tightly in the pores and on the surfaces of the petroleum coke granules. This filter body permits rapid flow of liquid to be filtered while effectively bringing the liquid into contact with the activated carbon. At the same time the activated carbon is not easily displaced from the carrier surfaces. Black filtrates, carbon contaminated filtrates, can be avoided even with high rates of filtration. And variations in filtration rates of an order producing black filtrates with composites of conventional activated carbons and carriers such as sand can be tolerated by my new product at both high and low levels of filtration rates.

Special advantages of my new activated carbon product in the treatment of sugar melts are detailed in my Patent No. 2,372,996.

I claim:

1. An activated carbon product consisting essentially of granular petroleum coke coated with about 3%–6% by weight of a partially oxidized channel carbon black having a mean particle size of less than about 100 millimicrons, substantially ash free and having a molasses value of at least 85.

2. An activated carbon product consisting essentially of granular petroleum coke coated with about 3%–6% by weight of a partially oxidized channel carbon black having a mean particle size of less than about 100 millimicrons, an ash content of less than 0.25% by weight and a molasses value of 85–90.

3. An activated carbon product consisting essentially of granular petroleum coke coated with about 3%–6% by weight of a partially oxidized channel carbon black having a mean particle size of less than about 60 millimicrons, substantially ash free and having a molasses value of at least 85.

4. A substantially dehydrated activated carbon product consisting essentially of granular petroleum coke coated with about 3%–6% by weight of a partially oxidized channel carbon black having a mean particle size of less than about 100 millimicrons, substantially ash free and having a molasses value of at least 85.

LEONARD WICKENDEN.

REFERENCES CITED

The following references are of record in the file of this patent:

UNITED STATES PATENTS

| Number | Name | Date |
|---|---|---|
| Re. 19,664 | Damon | Aug. 13, 1935 |
| 1,763,102 | Oberle | June 10, 1930 |
| 1,968,846 | Morrell | Aug. 7, 1934 |
| 2,149,671 | Franck | Mar. 7, 1939 |
| 2,209,069 | Bodenheim et al. | July 23, 1940 |
| 2,393,106 | Johnson et al. | Jan. 15, 1946 |

FOREIGN PATENTS

| Number | Country | Date |
|---|---|---|
| 450,450 | Great Britain | July 8, 1936 |

OTHER REFERENCES

Carbon Black, Its Manufacture, Properties, and Uses; Dept. of the Interior, Bureau of Mines, Bulletin #192, pages 15, 59, 64, 65, 78, and 79.